United States Patent [19]
Omi et al.

[11] Patent Number: 5,640,224
[45] Date of Patent: Jun. 17, 1997

[54] AUTOMATIC PHOTOGRAPHING APPARATUS IN A CAMERA

[75] Inventors: Junichi Omi, Kawasaki; Hiroshi Wakabayashi, Yokohama; Kiyosada Machida, Urawa, all of Japan

[73] Assignee: Nikon Corporation, Tokyo, Japan

[21] Appl. No.: 475,337

[22] Filed: Jun. 7, 1995

Related U.S. Application Data

[63] Continuation of Ser. No. 305,756, Sep. 14, 1994, abandoned, which is a continuation of Ser. No. 103,760, Aug. 10, 1993, abandoned, which is a continuation-in-part of Ser. No. 8,360, Jan. 22, 1993, abandoned.

[30] Foreign Application Priority Data

| Jan. 28, 1992 | [JP] | Japan | 4-035754 |
| Jan. 28, 1992 | [JP] | Japan | 4-037171 |
| Jan. 31, 1992 | [JP] | Japan | 4-042042 |
| Aug. 17, 1992 | [JP] | Japan | 4-217991 |

[51] Int. Cl.$^6$ ............................................. G03B 13/36
[52] U.S. Cl. ........................... 396/264; 396/265; 396/89
[58] Field of Search ....................... 354/400, 402–408, 354/266, 267.1, 268, 269

[56] References Cited

U.S. PATENT DOCUMENTS

| 4,350,418 | 9/1982 | Taguchi et al. | 354/268 |
| 5,047,793 | 9/1991 | Shiomi | 354/266 |
| 5,184,166 | 2/1993 | Shiina et al. | 354/400 |
| 5,216,459 | 6/1993 | Kosaka et al. | 354/400 |

FOREIGN PATENT DOCUMENTS

| 64-4095 | 2/1989 | Japan . |
| 2037335 | 2/1990 | Japan . |
| 3-213838 | 9/1991 | Japan . |
| 3-212635 | 9/1991 | Japan . |

Primary Examiner—Russell E. Adams

[57] ABSTRACT

A camera which prevents an invading body from being photographed and yet prevents a self-timer photographing time from being prolonged wastefully. The camera includes a distance measuring device for detecting object distances, a photo-taking device for effecting photo-taking and an angle of field switching device for switching the angle of field of a photo-taking lens in conformity with ON or OFF switches that are connected to a controller for carrying out a self-timer photographing process. During self-timer operation, the time counting of a main timer is started and object distance is repetitively measured. When object distances vary, time counting by the main timer is interrupted and an auxiliary timer is actuated so that self-timer photographing time is prolonged by the time set by the auxiliary timer. After the termination of time counting by the auxiliary timer, time counting by the main timer is restarted. When the angle of field of the lens is wider than or the passage position of the invading body is nearer to the object, the set time of the auxiliary timer is made longer to thereby prevent the waste of time that is necessary to carry out photographic operations.

7 Claims, 12 Drawing Sheets

AUTOMATIC PHOTOGRAPHING APPARATUS IN A CAMERA

This is a continuation, of application Ser. No. 08/305,756, filed Sep. 14, 1994, now abandoned, which is a continuation of application Ser. No. 08/103,760, filed Aug. 10, 1993, now abandoned, which is a continuation-in-part of application Ser. No. 08/008,360 filed Jan. 22, 1993, now abandoned.

BACKGROUND OF THE INVENTION

1. Field of the Invention

This invention relates to an automatic photographing apparatus in a camera having the functions of presetting a photographing starting condition, and effecting photographing when said condition is satisfied.

2. Related Background Arts

There are known some cameras which preset a photographing starting condition and automatically start photographing after the condition is satisfied.

One such automatic photographing camera is disclosed, for example, in Japanese Utility Model Publication No. 64-4095 which presets a photographing distance and automatically effects photographing when this preset photographing distance coincides with a detected object distance.

In this automatic photographing camera, if a photographing distance is preset, when the camera is used, for example, in the fashion of self-timer photographing, the preset photographing distance coincides with a detected object distance if a photographer (as object) lies at the preset photographing distance, and therefore photographing is automatically effected.

According to such a prior-art automatic photographing camera, however, if the preset photographing distance does not coincide with the detected object distance, photographing will not take place forever. That is, when the camera is used in the fashion of self-timer photographing, there has been the problem that even if the photographer himself thinks that he lies at the preset photographing distance, the preset photographing distance is not coincident with the detected object distance and therefore, photographing does not start forever.

Also, as a second one, a camera having the so-called self-timer function is designed such that when a self-timer is caused to start its time counting operation, release takes place when a predetermined time has elapsed. However, if a third person should cross the space between the object and the camera immediately before the predetermined time elapses and release takes place, the third person will also be photographed, and photographing will have to be effected again. For example, according to Japanese Laid-Open Patent Application No. 2-37335, it has been proposed to memorize the object distance immediately after the timer operation is started, and to permit release when the measured range value immediately after the termination of the timer operation coincides with said memorized value, but to prohibit release when the former value does not coincides with the latter value. If this is done, release will take place when the third person leaves the object field and therefore, failure in photographing will be prevented.

This proposal, however, has suffered from the problem that photographing takes much time because if a main object to be originally photographed moves or sways to the front or the rear or to right or left, the measured range value does not coincide with the memorized value and release is not readily permitted.

Further, as a third one, a camera having the focus locking function is designed such that the focus thereof is locked to a false object, whereafter the camera is turned to an original object and when the original object is at a position whereat it can be photographed in a locked focus state, release is automatically effected. Such a technique is disclosed, for example, in Japanese Utility Model Publication No. 64-4095.

Also, for example, Japanese Laid-Open Patent Application No. 3-212635 or Japanese Laid-Open Patent Application No. 3-213838 proposes that the release operation be started when the measured range value at the start of the sequence of the auto self-timer mode and the measured range value thereafter vary.

However, of these apparatuses, in the former, the in-focus state is not obtained when an object is not in the depth of field at a set distance and thus, photographing is not effected. This has led to the possibility of the shutter chance being missed.

Also, the latter has suffered from the problem that for example, when a passerby crosses the front of an original object, the release operation is started at a timing differing from that intended by the photographer.

Furthermore, the above-mentioned Japanese Laid-Open Patent Application No. 2-37335 discloses a camera in which the distance to an object in a distance measuring area set in a portion of a predetermined photographing area is measured at least twice during the time counting by a self-timer and when the object distance measured later does not coincide with the object distance measured earlier, the time counting by the timer is interrupted and at a point of time whereat the object distance restores the original one, the time counting is restarted and photographing is effected after the lapse of a predetermined time. According to such a camera, when a passerby, an automobile or the like crosses the front of the object in the distance measuring area, the time counting by the timer is interrupted until such an invading body comes out of the distance measuring area. Accordingly, if the remaining time from the restart of the time counting by the timer till photographing is set to a value greater than the time expected to be required for the invading body which has come out of the distance measuring area to frame out, the invading body will be prevented from being photographed. The time necessary for the invading body to frame out may be determined with man's pace which is guessed to be slowest of all invading bodies as the standard. In the example shown in the above-mentioned publication, the remaining time from after the restart of the time counting till photographing is indiscriminately set to two seconds.

However, when the time from the restart of the time counting by the timer till photographing is made constant as described above, the following problems will arise.

A first problem arises in a camera in which the angle of field of a photo-taking lens is variable. For example, in a camera with a multifocus lens, when the angle of field of a photo-taking lens widens, the time required for an invading body which has come out of the distance measuring area to frame out becomes long, and when the angle of field becomes narrow, the time required for the invading body to frame out becomes short. Therefore, to prevent the invading body from being photographed irrespective of the magnitude of the angle of field, it is necessary to determine the remaining time from the restart of the time counting till photographing with the time required for the invading body to frame out when the angle of field is widest as the standard, and as a result, when the angle of field becomes narrow, the remaining time from the restart of the time counting till photographing becomes wastefully long.

A second problem arises because the passage position of the invading body is not always fixed. Even if there is no change in the angle of field, the time required for the invading body to frame out differs depending on the distance from the photo-taking lens at which the invading body passes, and when the invading body crosses just the front of the object, a long time is required, and when the invading body crosses just the front of the photo-taking lens, a short time is only required. Accordingly, if the remaining time after the restart of the time counting is determined with the time when the invading body crosses just the front of the object as the standard, there will be a waste time when the invading body crosses near the photo-taking lens.

As described above, automatic photographing apparatus in cameras designed such that a condition regarding an object such as the object distance or the object depth is preset and photographing is effected when this condition is satisfied are already known, but they have suffered from the inconvenience that unless the preset condition is satisfied, photographing is not effected, whereby the shutter chance is missed, or photographing differing from that intended by the photographer is effected.

SUMMARY OF THE INVENTION

The present invention provides an automatic photographing apparatus in a camera which eliminates the above-noted inconveniences peculiar to the prior art and which is designed to effect photographing under a predetermined condition even if the predetermined condition is other than a preset photographing condition.

It is another object of the present invention to provide a camera which prevents an invading body from being photographed and yet prevents a self-timer photographing time from being prolonged wastefully.

According to a first embodiment of the present invention, an automatic photographing camera for automatically effecting photographing when a set distance coincides with a detected object distance is designed to forcibly effect photographing if the set photographing distance does not coincide with the detected object distance even when a predetermined time has elapsed.

Thus, according to the first embodiment, even if the set photographing distance does not coincide with the detected object distance, photographing will be effected without fail when a predetermined time elapses.

Therefore, according to the first embodiment of the present invention, for example, when the camera is used in the fashion of self-timer photographing even if the photographer does not lie exactly at the set photographing distance, photographing will be effected without fail when a forced release set time T elapses and thus, the problem that automatic photographing will not start forever is eliminated.

An automatic photographing apparatus in a camera according to a second embodiment of the present invention is provided with timer means for performing the time counting operation for automatic photographing, range-finding means for repetitively performing the range-finding operation during the time counting operation of said timer means, memory means for storing therein the measured range value by said range-finding means, renewing said stored measured range value to a new measured range value when the difference between the new measured range value and the stored measured range value is within a predetermined range, and intactly holding the stored measured range value when said difference is not within said predetermined range, focus adjusting means for adjusting the focus of a photographing optical system correspondingly to the measured range value stored in said memory means, and control means for permitting release if the difference between the new measured range value and the stored measured range value is within the predetermined range when the time counting operation of said timer means is completed, and prohibiting release if said difference is not within the predetermined range.

Thus, according to the second embodiment, when any other object than a main object has suddenly come into the object field, release is prohibited and also, even when the main object is swaying, the photographing of the main object can be effected without delay.

As described above, the automatic photographing apparatus in a camera according to the second embodiment of the present invention is designed such that release is permitted if the difference between the new measured range value and the stored measured range value is within the predetermined range when the time counting operation is completed, and release is prohibited if said difference is not within the predetermined range and therefore, not only the release when any other object than the main object has suddenly come into the object field can be prohibited, but also even when the main object is moving or swaying, the photographing thereof can be effected without delay.

An automatic photographing apparatus in a camera according to a third embodiment of the present invention is provided with setting means for setting an object distance at which photographing is to be effected, range-finding means for repetitively performing the range-finding operation after said object distance is set, photographing means for adjusting the focus correspondingly to the result of the range-finding by said range-finding means, and control means for permitting release when the measured range value by said range-finding means becomes a value within a preset predetermined range wider than the depth of focus with said object distance as the center.

Accordingly, even when an object is somewhat farther than the preset object distance, photographing can be reliably effected at a predetermined timing.

The automatic photographing apparatus in a camera according to the third embodiment is designed to permit release when the measured range value becomes a value within the predetermined range wider than the depth of focus with the object distance as the center and therefore, it becomes possible to automatically photograph any object reliably at a predetermined timing without missing the shutter chance.

DESCRIPTION OF THE PREFERRED EMBODIMENTS

An automatic photographing camera according to a first embodiment of the present invention is now described in detail with reference to FIGS. 1 to 4.

Figure 2:
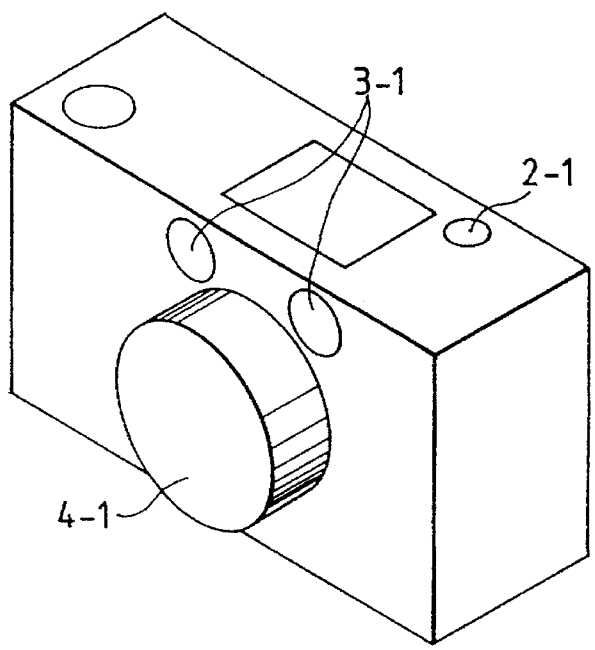
FIG. 2 is a pictorial perspective view showing an embodiment of an automatic photographing camera according to the present invention.
Figure 3:
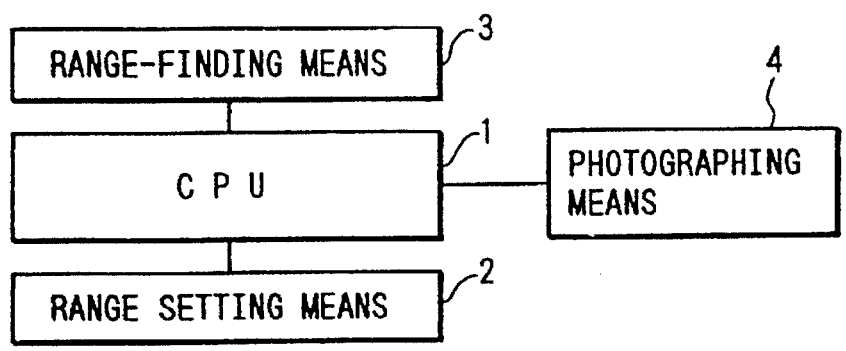
FIG. 3 is a block diagram showing the internal circuit construction of this automatic photographing camera.

FIG. 2 is a pictorial perspective view of this automatic photographing camera, and FIG. 3 is a block diagram showing the internal circuit construction of this automatic photographing camera.

In FIG. 3, reference numeral 1 designates a CPU for integrating the operation of the camera, reference numeral 2 denotes range setting means for setting a photographing range L for the CPU 1, reference numeral 3 designates range-finding means for measuring the range La to an object, and reference numeral 4 denotes photographing means such as a shutter necessary for photographing.

In FIG. 2, the reference numeral 2-1 designates a range setting button forming a part of the range setting means 2, the reference numeral 3-1 denotes a transmitting and receiving system forming a part of the range-finding means 3, and the reference numeral 4-1 designates a photo-taking lens forming a part of the photographing means 4.

Figure 1:
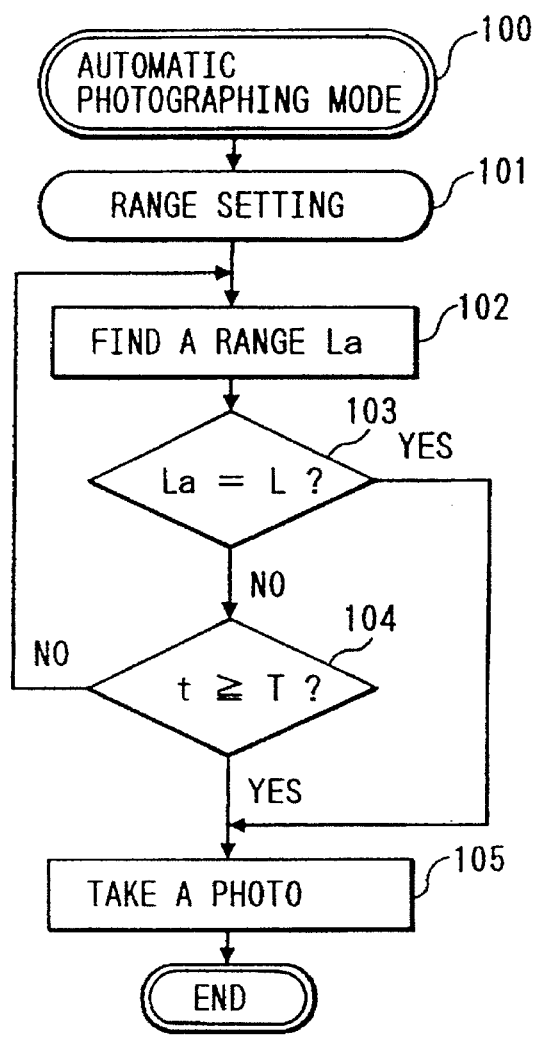
FIG. 1 is a flow chart for illustrating the processing function in a CPU shown in FIG. 3.

The processing function of the CPU 1 is described with reference to a flow chart shown in FIG. 1.

At the outset, let it be assumed that an automatic photographing mode is selected by a photographer by the use of a mode selecting button, not shown (step 100), and the photographing range L is set by the use of the range setting button 2-1 (step 101).

When in such a state, a release button (not shown) is depressed, the CPU 1 sends a command to the range-finding means 3 to thereby start to find the range La to the object (step 102). Then, whether the range La to the object (the detected object distance) coincides with the set photographing range L is confirmed (step 103), and if the range La does not coincide with the set photographing range L, advance is made to a step 104, and if the range La coincides with the set photographing range L, advance is made to a step 105, where photographing is effected. The set range L may be within a certain length range.

At the step 104, the time t from the start of range-finding is compared with a forced release set time T fixedly predetermined or determined by the photographer in case of photographing, and as long as the time t from the start of range-finding does not reach the forced release set time T, return is made to the step 102, where range-finding is repeated, and if the time t from the start of range-finding reaches the forced release set time T, advance is made to the step 105, where photographing is forcibly effected.

That is, according to the present embodiment, at a point of time whereat after the start of range-finding, the detected object distance La coincides with the set photographing range L, automatic photographing is effected, but if the detected object distance La does not coincide with the set photographing range L even when the forced release set time T has elapsed, photographing is forcibly effected.

Thus, according to the present embodiment, when for example, the camera is used in the fashion of self-timer photographing, even if the photographer does not lie exactly at the set photographing range L, photographing will be effected without fail if the forced release set time T elapses, and the problem that automatic photographing will not start forever is solved.

In the foregoing, the set photographing range L may be determined as a value having upper and lower photographing range L is defined as $L_{min}$ and the upper limits (e.g. 2–3 mm). That is, design may be made such that if the lower limit value of the set photographing range L is defined as $L_{min}$ and the upper limit value of the set photographing range L is defined and $L_{max}$ and $L_{min} \leq La \leq L_{max}$, the detected object distance La is regarded as coincident with the set photographing range L and automatic photographing is effected.

Also, in the foregoing, design may be made such that the forced release set time T can be freely changed by the photographer.

Further, the present invention is not restricted to the application during the single-shot automatic photographing as described above, but may be applied to a case where after a maximum number of frames to be exposed or a maximum photographing time is set, automatic photographing is continuously effected. In such case, the forced photographing at the interval of the forced release set time and the automatic photographing by the coincidence of the detected object distance with the set photographing range are combined together and are continuously effected until the set maximum number of frames to be exposed or the set maximum photographing time is reached.

Figure 4:
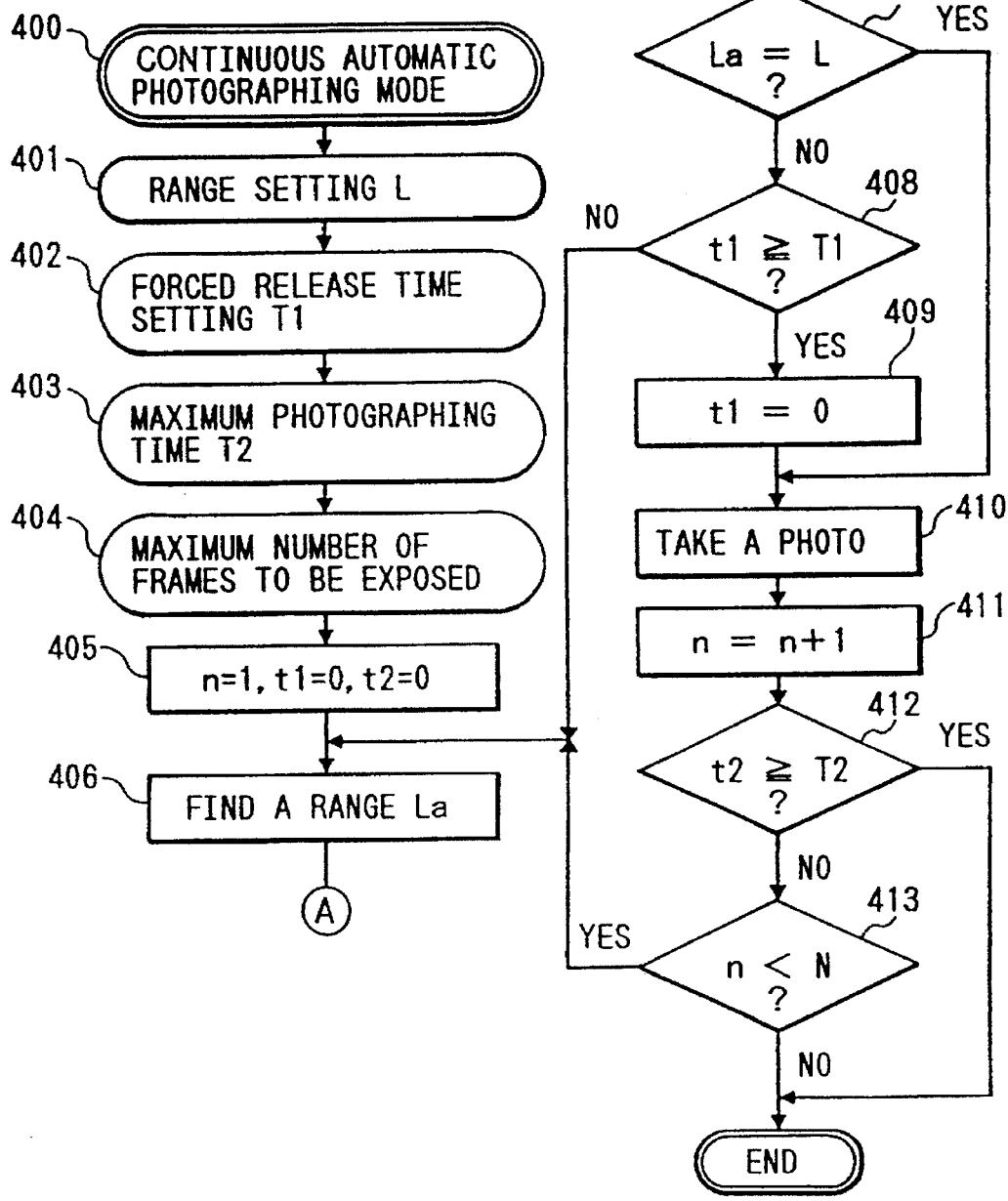
FIG. 4 is a flow chart for illustrating the processing function in the CPU when the present invention is applied to continuous automatic photographing effected with both of a maximum number of frames to be exposed and a maximum photographing time being set.

The processing function of the CPU 1 when the present invention is applied to continuous automatic photographing effected with both of the maximum number of frames to be exposed and the maximum photographing time being set will hereinafter be described with reference to a flow chart shown in FIG. 4.

At the outset let it be assumed that a continuous automatic photographing mode is selected by the photographer (step 400), the photographing range L is set (step 401), the forced release time T1 is set (step 402), the maximum photographing time T2 is set (step 403) and the maximum number of frames to be exposed N is set (step 404).

When in such a state, the release button is depressed, at a step 405, the CPU 1 substitutes 1 for a film counter n and starts its time counting with the forced release time t1 and the photographing time t2 as 0. The CPU 1 then sends a command to the range-finding means 3, which thus starts to find the range La to the object (step 406). Whether the detected object distance La coincides with the set photographing range L is confirmed (step 407), and if the detected object distance La does not coincide with the set photographing range L, advance is made to a step 408, and if the detected object distance La coincides with the set photographing range L, advance is made to a step 104, where photographing is started.

At the step 408, the forced release time t1 is compared with the forced release set time T1, and as long as the forced release time t1 does not reach the forced release set time T1, return is made to the step 406, where range-finding is repeated, and when the forced release time t1 reaches the forced release set time T1, at a step 409, the forced release time t1 is restored to 0 and the time counting thereof is effected from the beginning, whereafter advance is made to a step 410, where photographing is forcibly effected.

After photographing is effected at the step 410, 1 is added to the film counter n (step 411), where whether the photographing time t2 has reached the maximum photographing time T2 is confirmed (step 412), and whether the value of the film counter n has reached the maximum number of frames to be exposed N is confirmed (step 413), and if neither of them has reached, return is made to the step 406.

If at the step 412, the photographing time t2 reaches the maximum photographing time T2 or if at the step 413, the value of the film counter n reaches the maximum number of frames to be exposed N, continuous photographing is terminated.

While in the above-described embodiment, both of the maximum number of frames to be exposed N and the maximum photographing time T2 are determined, one of them may be determined. Design may also be made such that a timer is provided before photographing and when photographing is effected after a predetermined time has elapsed. Also, in the embodiment, the photographing range L is preset, but alternatively the range value measured immediately before photographing may be used as the set photographing range L.

It is also conceivable that the range value measured at first is used as the set photographing range L and continuous photographing is effected at a predetermined time interval, while forced photographing is effected when the detected object distance La becomes incoincident with the set photographing range L, that is, when a change occurs to the measured range value. By doing so, a variation in the photographing angle of view which could not be photographed by only continuous photographing at a predetermined time interval (interval photographing), for example, the flight of a bee setting on a flower or the like can be photographed without being missed.

Figure 5:
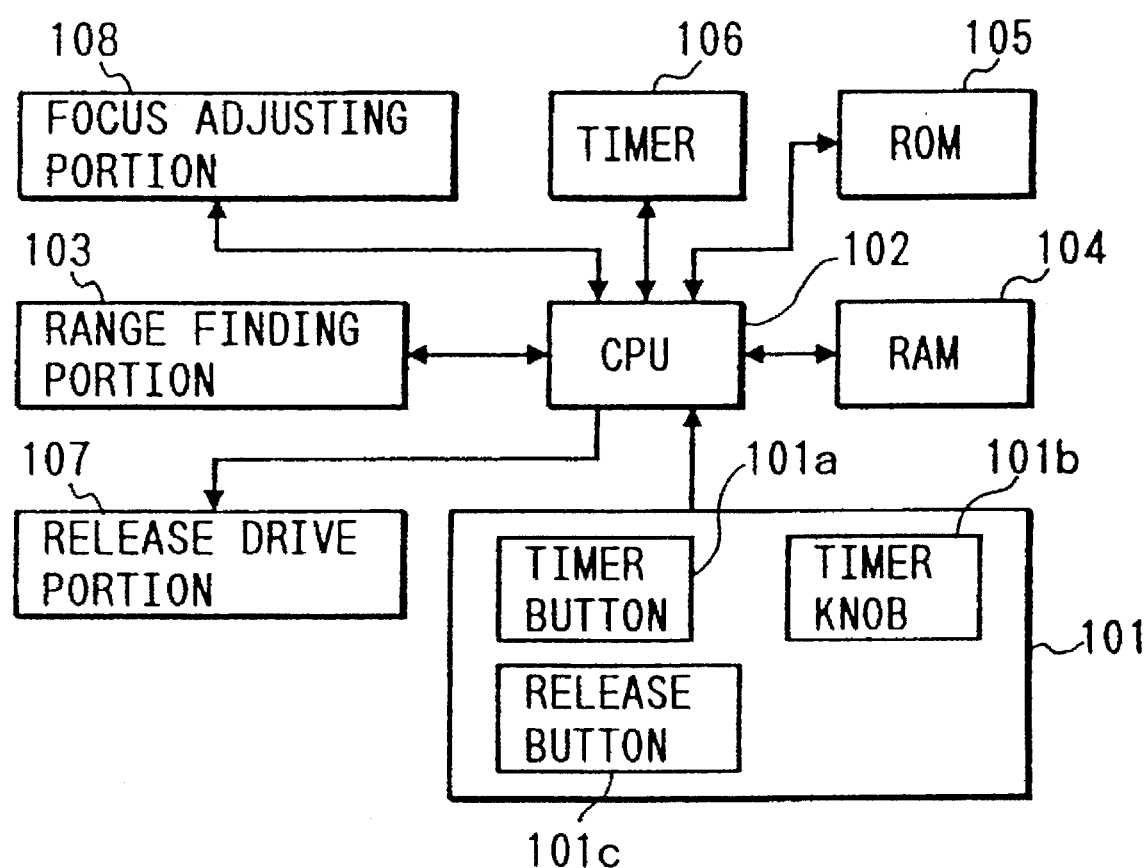
FIG. 5 is a block diagram showing the construction of an embodiment of the automatic photographing apparatus in a camera according to the present invention.

FIG. 5 is a block diagram showing the construction of an automatic photographing apparatus in a camera according to a second embodiment of the present invention. A CPU 102 controls the photographing operation of the camera in accordance with a program stored in an ROM 105. An input portion 101 has a timer button 101a operated when a self-timer is actuated, a timer knob 101b operated when the count time of the self-timer is set, and a release button 101c operated when release is effected, and design is made such that signals corresponding to those operations are supplied to the CPU 102.

A range finding portion 103 measures the distance to an object, and supplies the measured distance value to the CPU 102. The CPU 102 is designed to cause an RAM 104 to store this measured distance data therein as required. A timer 106 performs its time counting operation when automatic photographing is effected. This timer 106 can be contained in the CPU 102 as required. A release drive portion 107 is driven by the CPU 102 to thereby automatically depress the release button 101c. A focus adjusting portion 108 controls the focus of the photographing optical system (not shown) of the camera.

Figure 6:
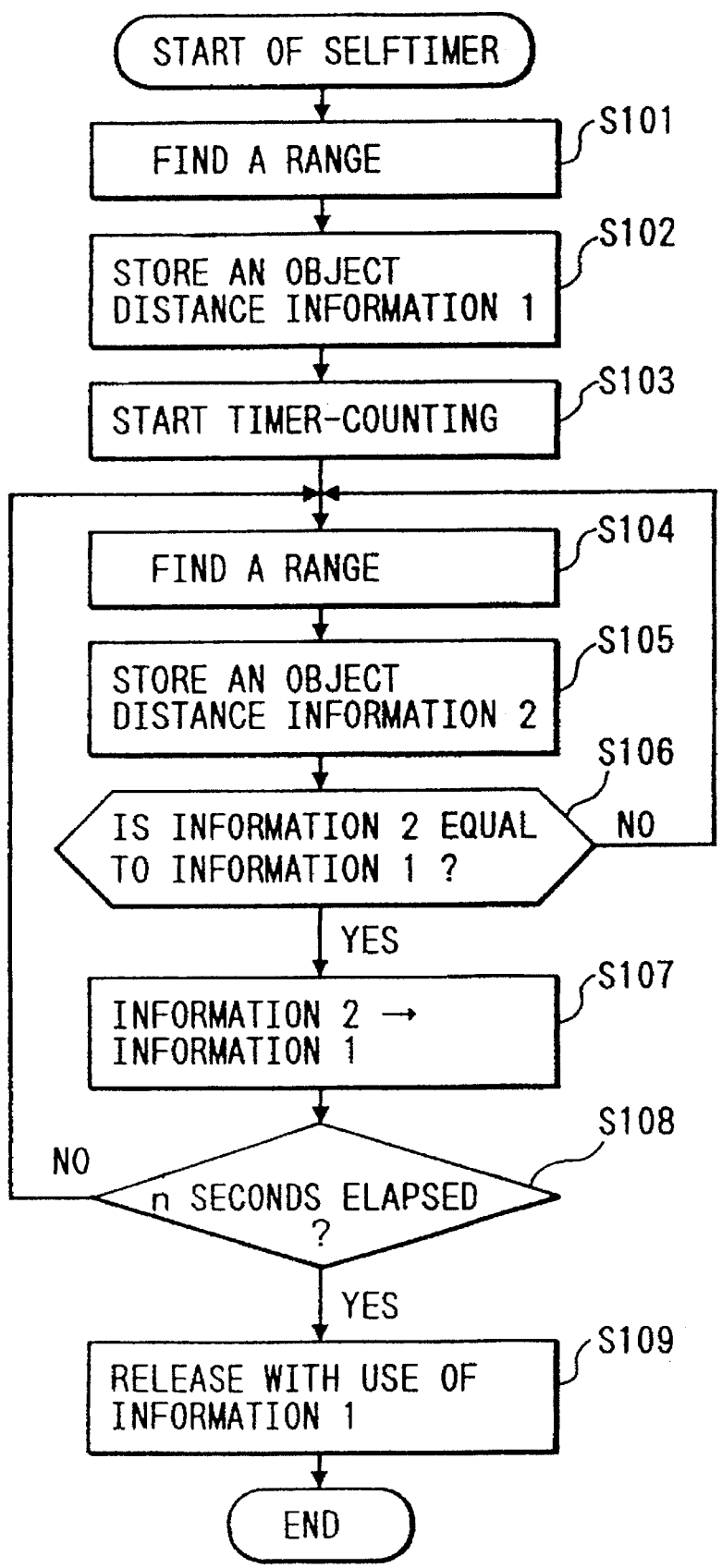
FIG. 6 is a flow chart for illustrating the operation of the embodiment of FIG. 5.

The operation of this embodiment will now be described with reference to the flow chart of FIG. 6. The CPU 102 starts the processing shown in FIG. 6. First, at step S101, the CPU 102 controls the range finding portion 103 so as to cause the latter to measure the distance to the object. At a step S102, the CPU 102 writes this measured distance value into the RAM 104 and causes it to be stored in the RAM. Further, at a step S103, the CPU 102 controls the timer 106 so as to cause the latter to start its time counting operation.

Subsequently, at a step S104, the CPU 102 again causes the range finding portion 103 to execute its range finding operation. At a step S105, the CPU 102 causes the RAM 104 to store the then measured distance value therein. Thus, the first measured distance value (the measured distance value at the step S102) immediately after (or immediately before) the timer 106 has started its time counting operation and the second measured distance value (the measured distance value at the step S105) after the timer 106 has started its time counting operation are stored in the RAM 104. At a step S106, the CPU 102 compares the first measured distance value and the second measured distance value with each other, and judges whether the two values are substantially continuous, that is, whether the difference between the two values is within the range of a preset predetermined reference value.

When the difference between the first measured distance value and the second measured distance value is greater than the reference value (that is, when the two values are substantially discontinuous), return is made to the step S104, and the processing thereafter is repeated. This case corresponds to a case where, for example, any other object than a main object to be originally photographed has suddenly come into the object field.

In contrast, when at the step S106, it is judged that the difference between the first measured distance value and the second measured distance value is within the range of the reference value (the two values are substantially continuous, i.e., equal to each other), advance is made to a step S107, where the second measured distance value is set as the first measured distance value. That is, if the newly measured second distance value differs from the first distance value measured immediately after the time counting operation of the timer 106, but the difference therebetween is a small one within the range of the reference value (in other words, the two values are substantially continuous), the main object is regarded as moving or swaying and the first measured distance value is renewed by the second measured distance value.

Subsequently, at a step S108, the timer 106 starts its time counting operation, whereafter whether the time (n seconds) set by the knob 101b has elapsed is judged, and if it has not elapsed, return is made to the step S104, and the processing thereafter is repeated. Thus, for the period during which the timer 106 performs its time counting operation, the latest measured distance value corresponding to the continuous movement of the main object is renewed as the first measured distance value.

When at the step S108, it is judged that n seconds has elapsed, advance is made to a step S109, where the release operation is executed correspondingly to the first measured distance value. That is, the CPU 102 controls the focus adjusting portion 108 correspondingly to the first measured distance value stored in the RAM 104 and adjusts the focus of the photographing optical system of the camera to the main object. Further, the CPU 102 controls the release drive portion 107 to thereby automatically depress the release button 101c, thus executing the photographing of the main object.

When the main object is moving or swaying like this, the measured distance value at each range finding timing is substantially continuous and therefore, focus adjustment is effected to the latest measured distance position of the main object, and at the timing whereat n seconds which is the set time by the timer 106 has elapsed, photographing is effected without delay. In contrast, when any other object has suddenly come into the object field while the timer 106 is performing its time counting operation, the measured distance value varies discontinuously (greatly) and therefore, at that timing, processing does not proceed from the step S106 to the step S107, and the processing of the steps S104 to S106 is repeated. As a result, even if n seconds has elapsed, release is prohibited until the object which has suddenly come into the object field comes off the object field and a measured distance value substantially continuous with the stored measured distance value is detected.

A third embodiment of the present invention will now be described with reference to FIGS. 7 to 10.

Figure 8:
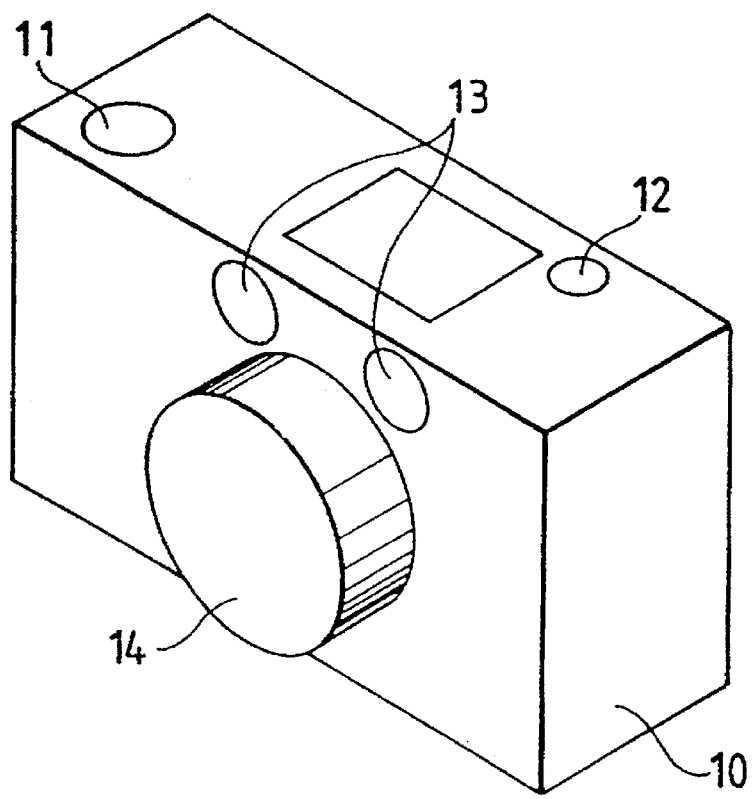
FIG. 8 is a pictorial perspective view of the automatic photographing camera shown in FIG. 7.

FIG. 8 is a perspective view showing the construction of a camera according to the third embodiment. A camera body 10 has mounted on the front face thereof a photographing optical system 14 including a photo-taking lens. A range-finding device 13 for measuring the distance to an object is provided above the photographing optical system 14. A release button 11 operated when release is effected is provided on the right side of the upper surface of the camera body 10, and a mode selecting button 12 is provided on the left side thereof. This mode selecting button 12 is operated when a self-timer mode or a catch in-focus mode is set.

Figure 7:
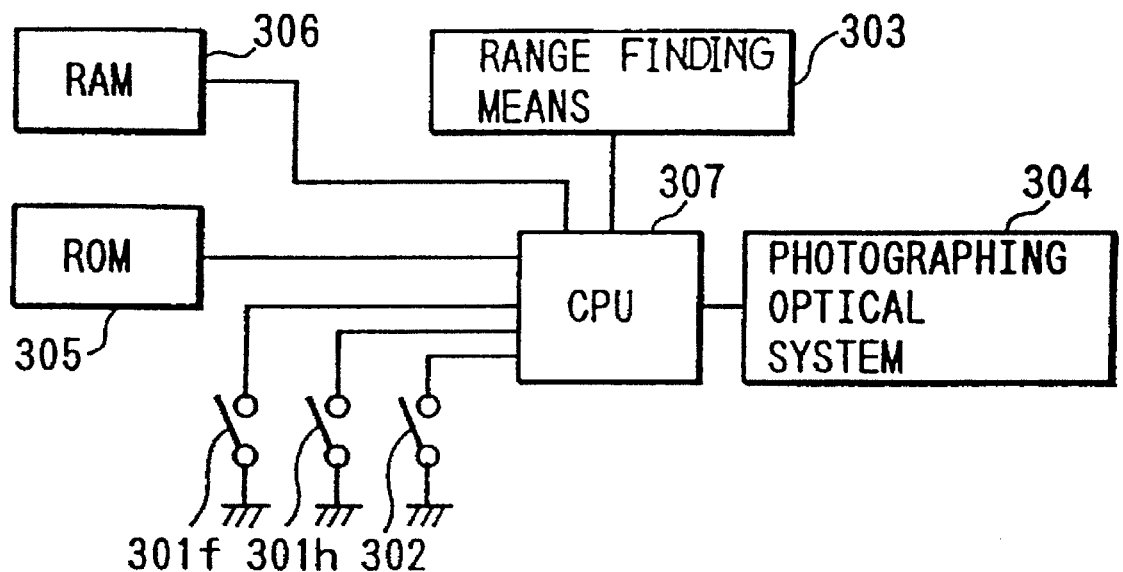
FIG. 7 is a block diagram showing the construction of an embodiment of the automatic photographing apparatus in a camera according to the present invention.

FIG. 7 shows an embodiment of the electrical construction of the automatic photographing apparatus in a camera according to the present invention. A CPU 307 is designed to control the photographing operation in accordance with a program prestored in an ROM 305. Switches 301f and 301h are adapted to be closed when a release button 301 is half-depressed or fully depressed. An RAM 306 is designed to store therein data obtained as a result of the range-finding by the range-finding device 303 and other data as required.

Figure 9:
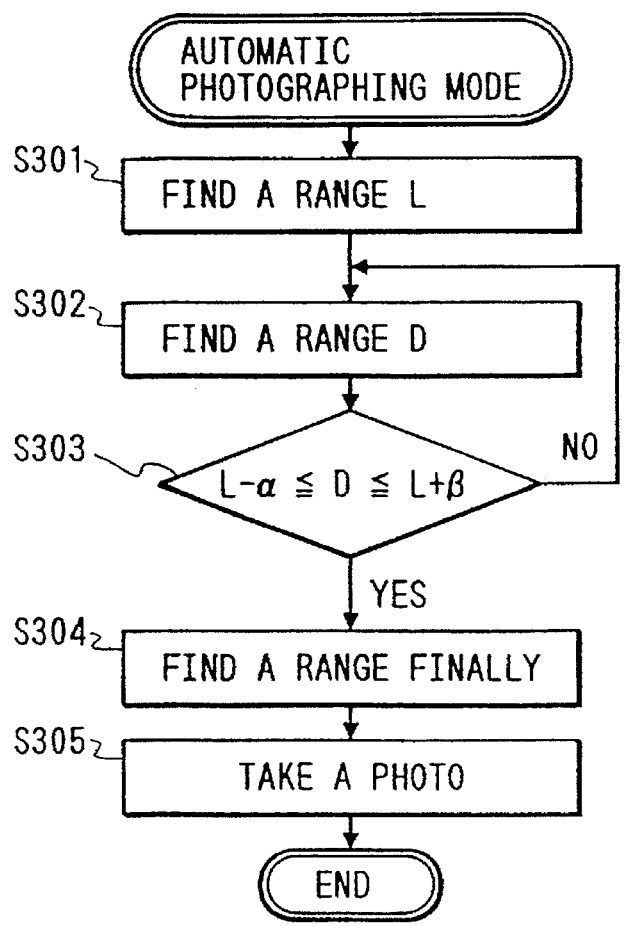
FIG. 9 is a flow chart for illustrating the operation of the embodiment of FIG. 7.

The operation of the present embodiment will now be described with reference to the flow chart of FIG. 9. When the mode selecting button 12 is operated to set the catch in-focus mode, the processing shown in the flow chart of FIG. 9 is executed. First, at a step S301, a predetermined range is set. The setting of this range is effected in the following manner. For example, when the release button 11 is half-depressed to close the switch 301f, the CPU 307 controls the range-finding device 303, which thus finds the range to an object toward which the camera is turned at that time. The operation of the release button 11 is then released and the measured range value L by the range-finding device 303 at the timing whereat the switch 301f has been opened is stored in the RAM 306. That is, by the camera being turned toward a tentative object and the release button 11 being half-depressed, focus lock is effected.

Of course, alternatively, design may be made such that without resorting to such focus lock, a predetermined range can be manually input.

When the setting of the range is thus effected, the CPU 307 proceeds to a step S302, where the range-finding device 303 is controlled so as to repetitively execute the range-finding operation. At a step S303, the CPU 307 judges whether the latest measured range value D obtained as a result of the range-finding effected at the step S302 satisfies the following condition:

$$L-\alpha \leq D \leq L+\beta,$$

where $\alpha$ and $\beta$ are values greater than ½ of the depth of focus of the photographing optical system 14 and prestored in the RAM 306, and can each be set to e.g. 2 m. These values may be fixed, or may be changed to any values as required by the operator.

When the measured range value D obtained as a result of the range-finding effected at the step S302 is not within the above-mentioned range, the CPU 307 returns to the step S302, where the range-finding operation is repetitively executed. When it is judged that the measured range value D is within the above-mentioned range, advance is made to a step S304, where the CPU 307 again controls the range-finding device 303 to cause the latter to execute the range-finding operation. Advance is then made to a step S305, where photographing is executed. That is, the CPU 307 controls the photographing optical system 14 correspondingly to the latest measured range value obtained as a result of the range-finding effected at the step S304, and adjusts the focus thereof. When the adjustment of the focus is completed, photographing is automatically executed.

In the foregoing, when at the step S303, it is judged that the measured range value D is within a predetermined range, advance is immediately made to the step S304, where final range-finding is effected, but it is also possible to insert a step for waiting for a predetermined time between the two steps, and effect final range-finding at a timing whereat a predetermined time has elapsed after the measured range value D has come into the predetermined range.

Figure 10:
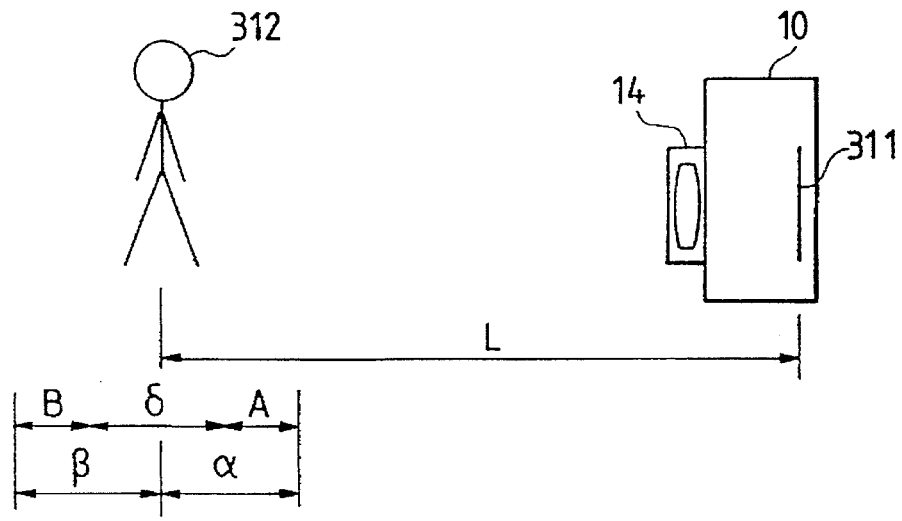
FIG. 10 is a conceptual view for illustrating the operation of the embodiment of FIG. 8.

FIG. 10 is a view for illustrating the above-described operation. That is, at the step S301, the distance L from film 311 contained in the body 10 to an object 312 is set. This distance L is set by the use of not an original object, but a tentative original. For example, when the photographer wants to photograph himself with a predetermined background at his back, he installs the camera on a stand and finds out a pseudo-object lying at a distance which seems to be equal to the distance from that location to a location at which he is expected to lie for photographing, and turns the camera 10 toward that object and effects focus lock to the pseudo-object. Thereby, the distance L is set.

Subsequently, the photographer re-turns the camera body 10 in a direction in which he wants to photograph. Thereafter, the photographer himself moves to that location toward which the camera is turned, and looks toward the camera body 10. At this time, the distance between the camera body 10 and the object 312 is a distance substantially corresponding to the distance L. Thus, when the distance D from the camera body 10 to the object is within a range prescribed by $L-\alpha$ and $L+\beta$, the range-finding operation is performed again and photographing is effected correspondingly to the measured range value resulting therefrom.

When the depth of focus of the photographing optical system 14 is $\delta$, the prior-art apparatus has been designed such that photographing is effected only when the object 312 is within the range of $L\pm\delta/2$, but in the present embodiment, photographing is effected when the object 312 is within the range of $\alpha+\beta$ wider than $\delta$. That is, photographing is executed even within the range of $A(=\alpha-\delta/2)$ or $B(=\beta-\delta/2)$ exceeding the depth of focus δ. Final range-finding is effected at the step S304 and thus, even when the object 312 lies within this range A or B, out-of-focus will never occur. Of course, when a passerby crosses the outside of the range of α+β, release is not permitted and therefore, the release operation is prevented from being started at any timing which is not intended by the photographer.

Figure 11:
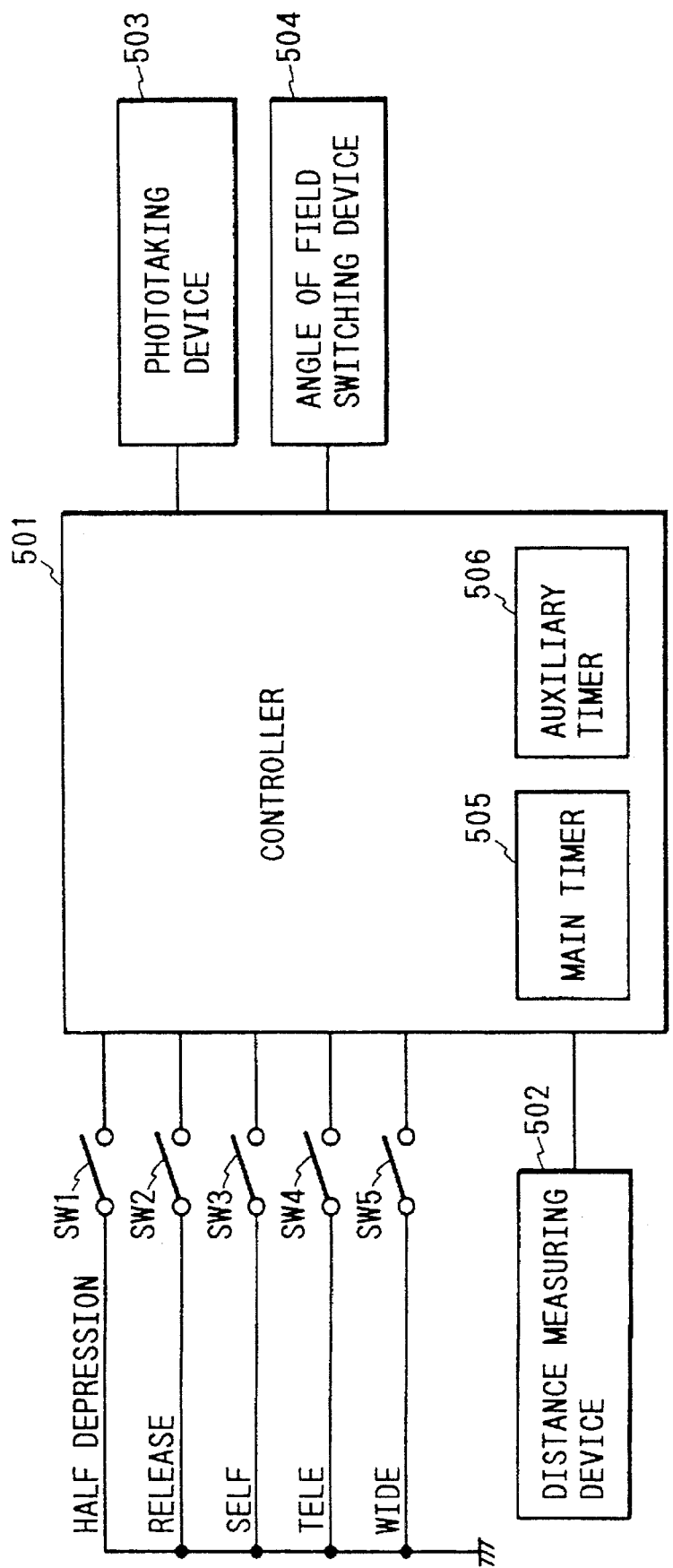
FIG. 11 shows the circuit construction of a camera according to a further embodiment of the present invention.

FIG. 11 shows the circuit construction of a camera according to a further embodiment of the present invention. The reference numeral 501 designates a controller for controlling the operation of the camera. This controller 501 has connected thereto a half depression switch SW1 adapted to be closed by the half depression of a release button, not shown, a release switch SW2 adapted to be closed by the full depression of the release button, a self-timer switch SW3 adapted to be closed by the push-in of a self-timer button, not shown, a tele switch SW4 adapted to be closed by the push-in of a telephoto selecting button, not shown, and a wide switch SW5 adapted to be closed by the push-in of a wide angle selecting button, not shown.

In addition to the switches SW1-SW5, a distance measuring device 502, a photo-taking device 503 and an angle of field switching device 504 are also connected to the controller 501. The distance measuring device 502 measures the distance to an object in a distance measuring area set at a portion, e.g. the central portion of a photographing area and outputs a distance signal conforming to the result of the measurement. As the distance detecting method, use is made of one of various conventional methods including a method of emitting infrared light toward an object and calculating the object distance from the position of the reflected light therefrom.

The photo-taking device 503 effects photographing and the winding of film in response to a command from the controller 501. During ordinary photographing, when the half depression switch SW1 is closed by the push-in of the release button, the distance measuring device 502 starts the measurement of the object distance, and when the full depression switch SW2 is then closed, a command is sent from the controller 501 to the photo-taking device 503, whereby the photo-taking device 503 starts its photo-taking operation. During this photo-taking operation, the focusing of a photo-taking lens, not shown, is effected in conformity with a distance signal from the distance measuring device 502 and also, the shutter speed and the aperture value of the photo-taking lens are adjusted on the basis of a command from an exposure control device, not shown.

The angle of field switching device 504 serves to switch the angle of field of the photo-taking lens to two stages in response to a command from the controller 501, and when the tele switch SW4 is closed, the angle of field is switched to the telephoto side, and when the wide switch SW5 is closed, the angle of field is switched to the wide angle side. The ON and OFF states of the switches SW4 and SW5 are memorized by the controller 501, whereby on which of the wide angle side and the telephoto side the angle of field of the photo-taking lens is during photographing is discriminated.

Two kinds of timers, i.e., a main timer 505 and an auxiliary timer 506, are contained in the controller 501 in preparation for self-timer photographing. The main timer 505 serves to count the self-timer photographing time, and the set time till time up is made equal to the self-timer photographing time (e.g. 10 seconds) of an ordinary camera. The auxiliary timer 506 is for prolonging the self-timer photographing time, and the set time thereof is set to one of St seconds as a standard time and Sw seconds longer than that, in accordance with a procedure which will be described later. These set times St and Sw are determined in conformity with the angle of field of the photo-taking lens, and the setting method therefor will hereinafter be described with reference to FIG. 12.

Figure 12:
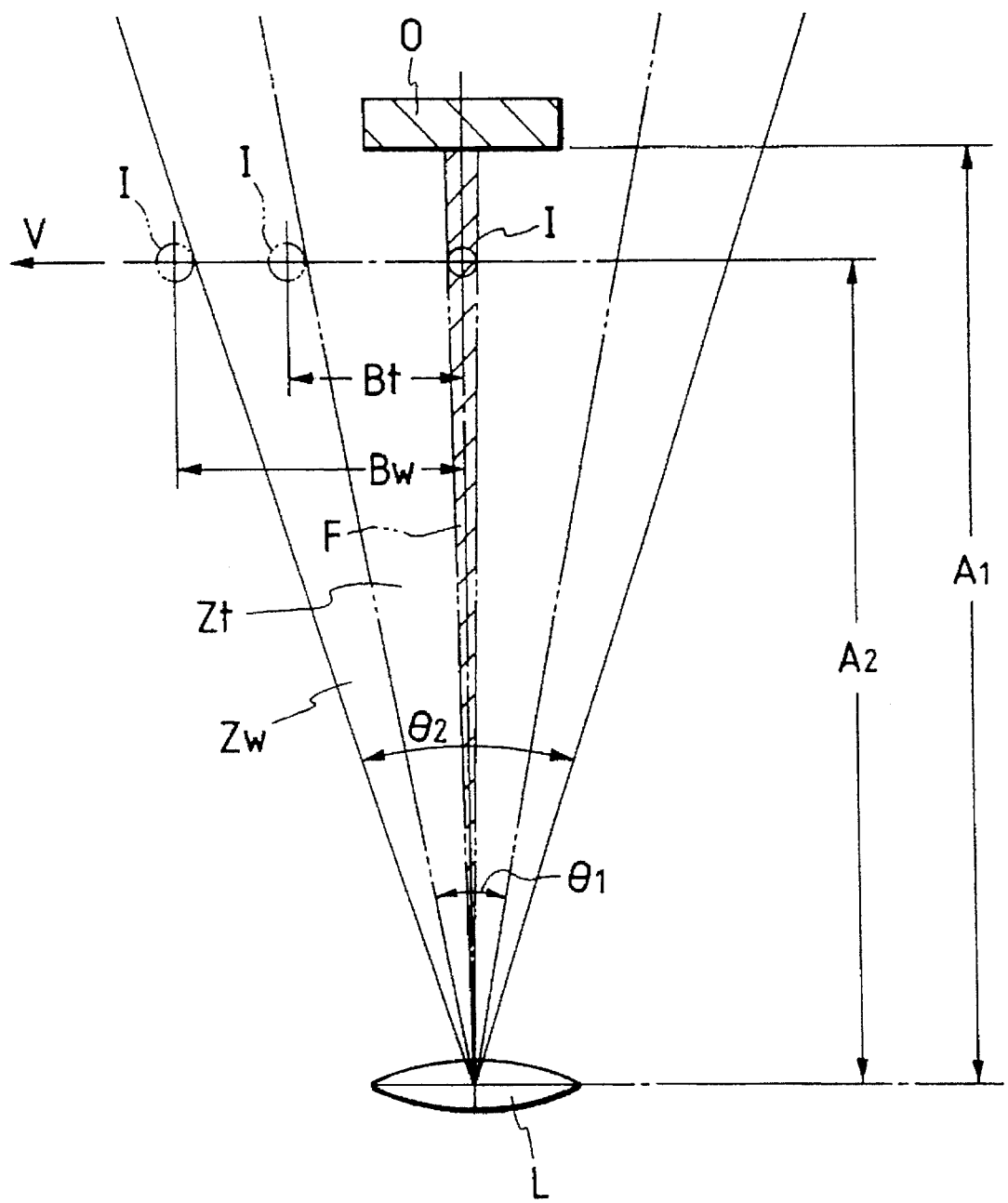
FIG. 12 is a view for illustrating a method of setting an auxiliary timer counting time in the embodiment of FIG. 11.

When in FIG. 12, the distance from the photo-taking lens L to a desired object O is $A_1$ and the distance from the photo-taking lens L to an invading body I is $A_2$ and the movement velocity of the invading body I is V, a constant, and the angle of field of the photo-taking lens L can be switched to two stages $\theta_1$ and $\theta_2$ and the photographing areas corresponding to these are Zt and Zw, the movement distances Bt and Bw until the invading body I which has come into a distance measuring area F set at the center of the photographing areas Zt and Zw deviates from the photographing areas Zt and Zw are affected by the size of the invading body I, but can be generally calculated from the angles of field $\theta_1$ and $\theta_2$ and the distance $A_2$ of the invading body I. So, these movement distances Bt and Bw are divided by the movement velocity v to thereby find the foreseen times until the invading body I moves from the distance measuring area F to the outside of the photographing areas Zt and Zw, and some surplus time is added to the foreseen times, and the results thereof are defined as the set times St and Sw. The distance $A_1$ can be suitably selected from the range (e.g. 3–10 m) of the photographing distance at which the frequency of self-timer photographing is supposed to be high. Also, the distance $A_2$ is determined to be as approximate as possible to the distance $A_2$. This is because if the distance $A_2$ is too short, the time until the invading body I deviates from the photographing areas Zt and Zw will be short and the provision of the auxiliary timer 506 will become meaningless. The movement velocity v may preferably be adjusted to man's average pace.

Figure 13:
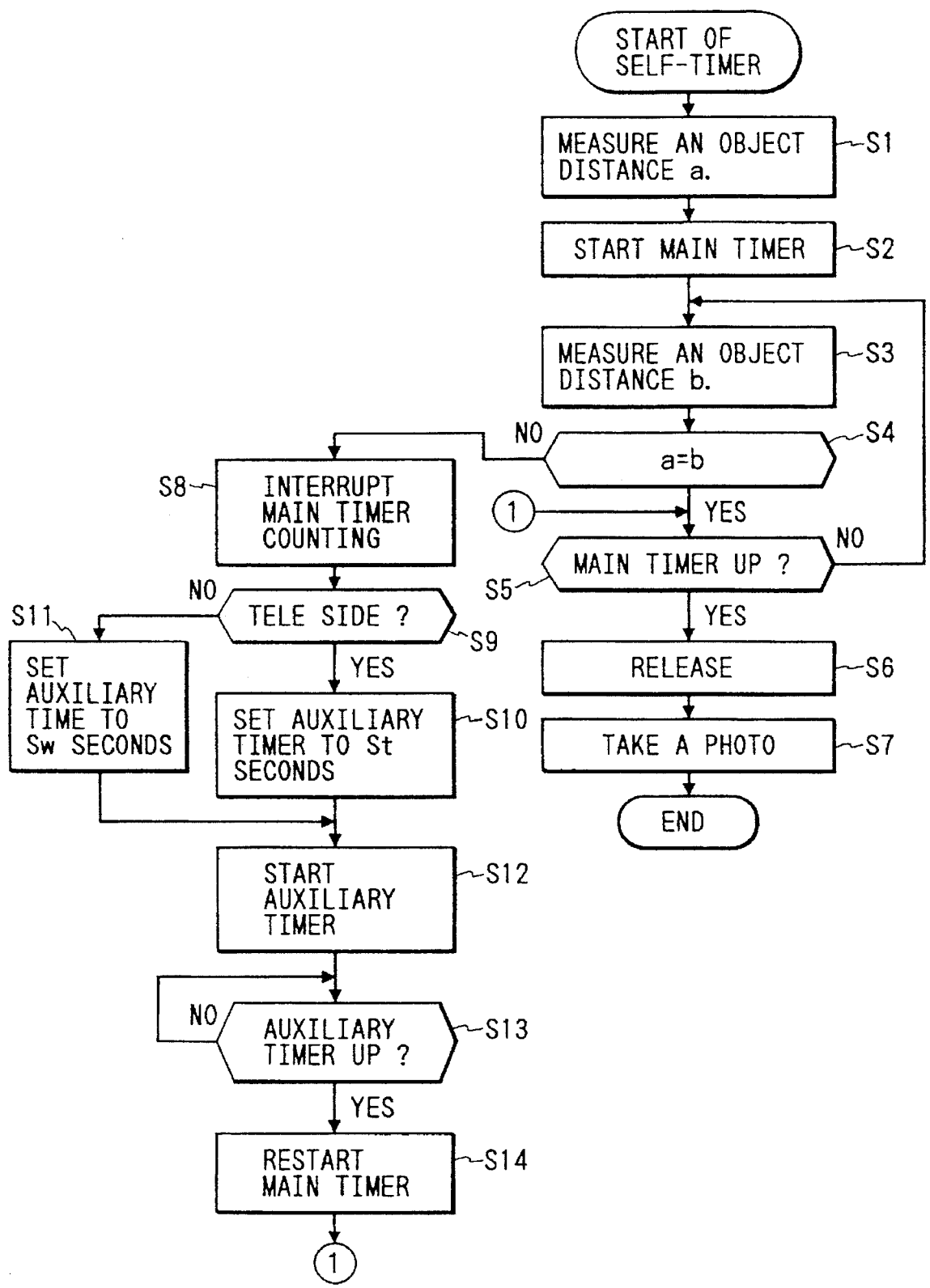
FIG. 13 is a flow chart showing a processing procedure in the controller of the FIG. 11 embodiment.

In the camera of the above-described construction, when the self-timer button is depressed to close the self-timer switch SW3, the self-timer photographing process by the controller 501 is started. The procedure for it will hereinafter be described with reference to the flow chart of FIG. 13.

When the self-timer switch SW3 is closed, at a step S1, the controller 501 causes the distance measuring device 502 to effect distance measurement and memorizes the result of the measurement as an object distance a. At the next step S2, the controller 501 actuates the main timer 505 to start the counting of the self-timer photographing time.

Subsequently, at a step S3, distance measurement is effected by the distance measuring device 502 to find an object distance b, and at a step S4, whether the previously found object distance a and the object distance b coincide with each other is judged. If the object distances a and b coincide with each other, advance is made to a step S5, where the main timer 505 judges whether time is up. If the main timer 505 judges that time is not up, return is made to the step S3, and the measurement of the object distance b is repeated until the main timer 505 judges that timer is up. If the main timer 505 judges that time is up, advance is made to a step S6, where a release signal is output to the phototaking device 503 to start the photo-taking operation, and at a step S7, a predetermined photo-taking operation is performed, thus terminating the self-timer photographing process.

If at the step S4, it is judged that the object distance b does not coincide with the first object distance a, advance is made to a step S8, where the time counting by the main timer 505 is interrupted. Then at a step S9, whether the angle of field of the photo-taking lens is on the telephoto side is judged, and if it is judged that the angle of field is on the telephoto side, advance is made to a step S10, where the count time of the auxiliary timer 506 is set to St seconds. If it is judged that the angle of field of the photo-taking lens is not on the telephoto side, but on the wide angle side, advance is made to a step S11, where the count time of the auxiliary timer 506 is set to Sw seconds longer than St seconds.

When the count time of the auxiliary timer 506 is set, advance is made to a step S12, where the auxiliary timer 506 is actuated. At a step S13, whether time is up is judged, and if time is not up, the judgment is repeated. At a point of time whereat the auxiliary timer 506 judges that time is up, advance is made to a step S14, where the time counting by the main timer 505 is restarted, and the process is advanced to a step S5.

According to the above-described processing procedure, when an undesired person or the like invades to the front of the object in the distance measuring area during the counting of the self-timer photographing time, the distance to this invading body is measured as the object distance b at the step S3 and the step S4 is negated. By the process of the step S8 to S14, the count time of the auxiliary timer 506 is added to the count time of the main timer 505, and the remaining time till the start of the photographing operation is prolonged. The count time of the auxiliary timer 506, as already described, is determined to a greater value than the foreseen time until the invading body in the distance measuring area frames out and therefore, the possibility of the invading body being photographed is little.

Moreover, in the present embodiment, the amount of prolongation of the self-timer photographing time by the auxiliary timer 506 is not uniform as in the prior art, and by the process of the steps S9 to S11, it is set to St seconds when the angle of field is narrow, and it is set to Sw seconds longer than that when the angle of field is wide and therefore, when the angle of field is narrow, the self-timer photographing time is not wastefully prolonged.

Figure 14:
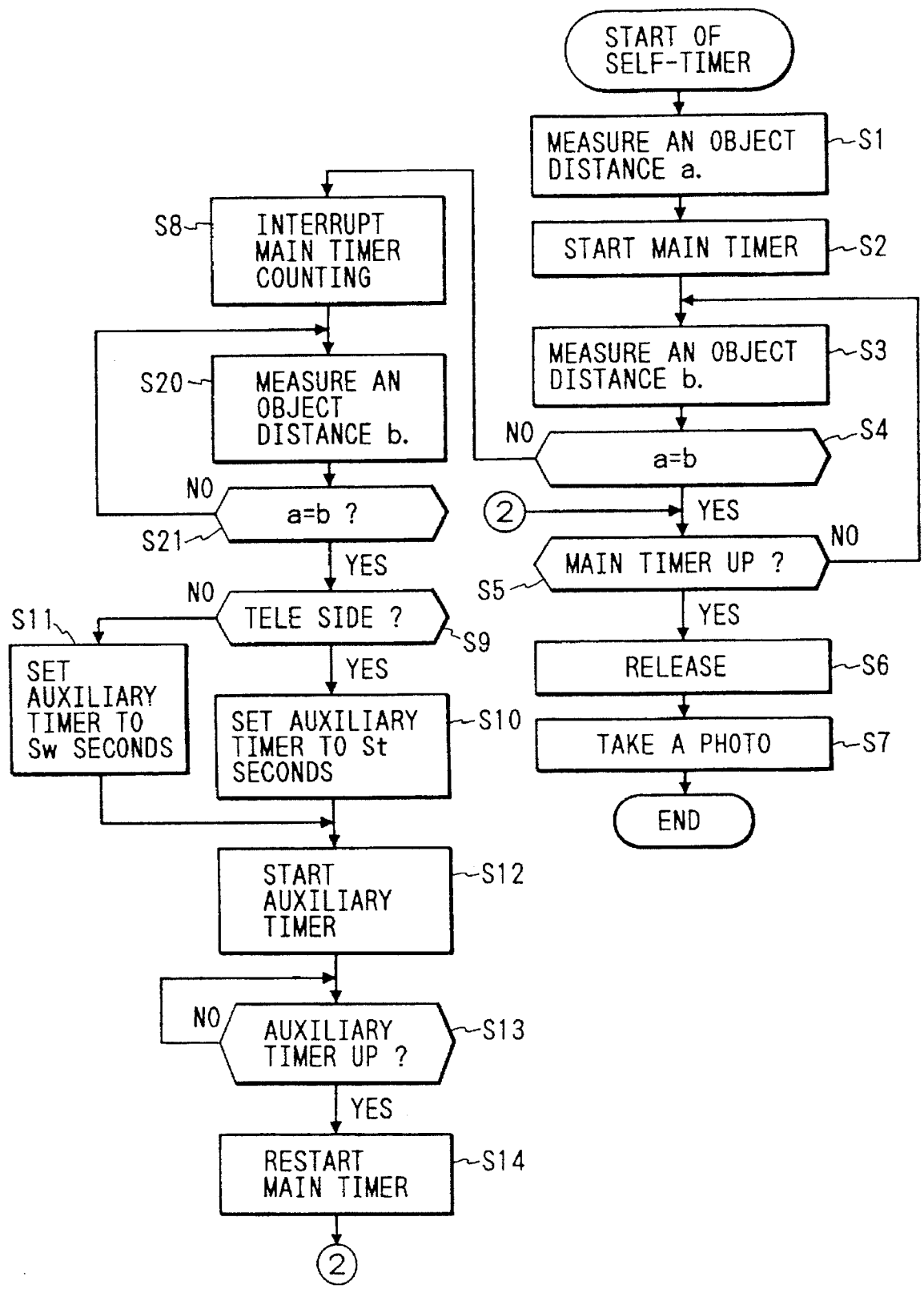
FIG. 14 is a flow chart showing a processing procedure in the controller of the FIG. 11 embodiment.

Reference is now had to FIG. 14 to describe still another embodiment applied to a camera with a two-focus lens. This embodiment, as compared with the embodiment shown in FIG. 11, is such that the processing procedure for self-timer photographing by the controller 501 is changed. Accordingly, hereinafter, only the differences from the embodiment of FIG. 11 will be described and portions common to those in the embodiment of FIG. 11 are given similar reference characters and need not be described.

As shown in FIG. 14, in the present embodiment, the processing procedure when the step S4 is negated in the process of self-timer photographing differs from the embodiment of FIG. 11. That is, in the present embodiment, when the object distance a immediately after the start of the self-timer and the object distance b measured after that do not coincide with each other, at a step S8, the time counting by the main timer 505 is interrupted, whereafter at a step S20, the object distance b is measured and at a step S21, whether it coincides with the object distance a measured at first is judged. If it does not coincide, return is made to the step S20, whereafter the measurement of the object distance b is repeated until the object distance b coincides with the first object distance a. When the object distance b coincides with the object distance a, advance is made to a step S9, whereafter the addition process of the self-timer photographing time up to a step S14 is executed and advance is made to a step S5.

According to the above-described process, the count time of the auxiliary timer 506 is changed in conformity with the angle of field of the photo-taking lens and therefore, as in the embodiment of FIG. 11, the self-timer photographing time is not wastefully prolonged when the angle of field is narrow. In addition, owing to the process of the steps S20 and S21, even if the time counting by the main timer 505 is interrupted, the time counting by the auxiliary timer 506 is not started until the object distance b coincides with the first object distance a and thus, when for example, the invading body comes to a half in the distance measuring area, the time until the invading body begins to move toward the outside of the photographing area, in addition to the amount of prolongation of the self-timer photographing time by the auxiliary timer 506, is added to the self-timer photographing time, and the invading body is more reliably prevented from being photographed.

In the above-described embodiments of FIGS. 11 and 14, a camera with a two-focus lens has been taken as an example, but the present invention is applicable to all camera in which the angle of fields of a lens can be changed, such as a multifocus camera in which the focal length is switched and a camera with a zoom lens. Where the present invention is applied to a lens interchange type camera such as a single-lens reflex camera, to discriminate the angle of field of the lens, an ROM storing the focal length therein can be provided on the lens side and the focal length information can be read as required. The detection of the object distance is not limited to the direct measurement of the distance, but use may be made of any system for detecting a parameter varying in conformity with the object distance to thereby calculate the object distance, such as a system for finding the object distance on the basis of the amount of deviation between a surface lying at a location equivalent to the surface of film and the imaging plane of an object and the then focal length of the photo-taking lens. The distance measuring area is neither limited to the center of the photographing area, but may also be multipoint distance measurement. The method of prolonging the self-timer photographing time is neither limited to the example in which the time counting by the main timer 505 is interrupted and the auxiliary timer 506 is actuated, but the set time itself of the main timer 505 may be changed.

Figure 15:
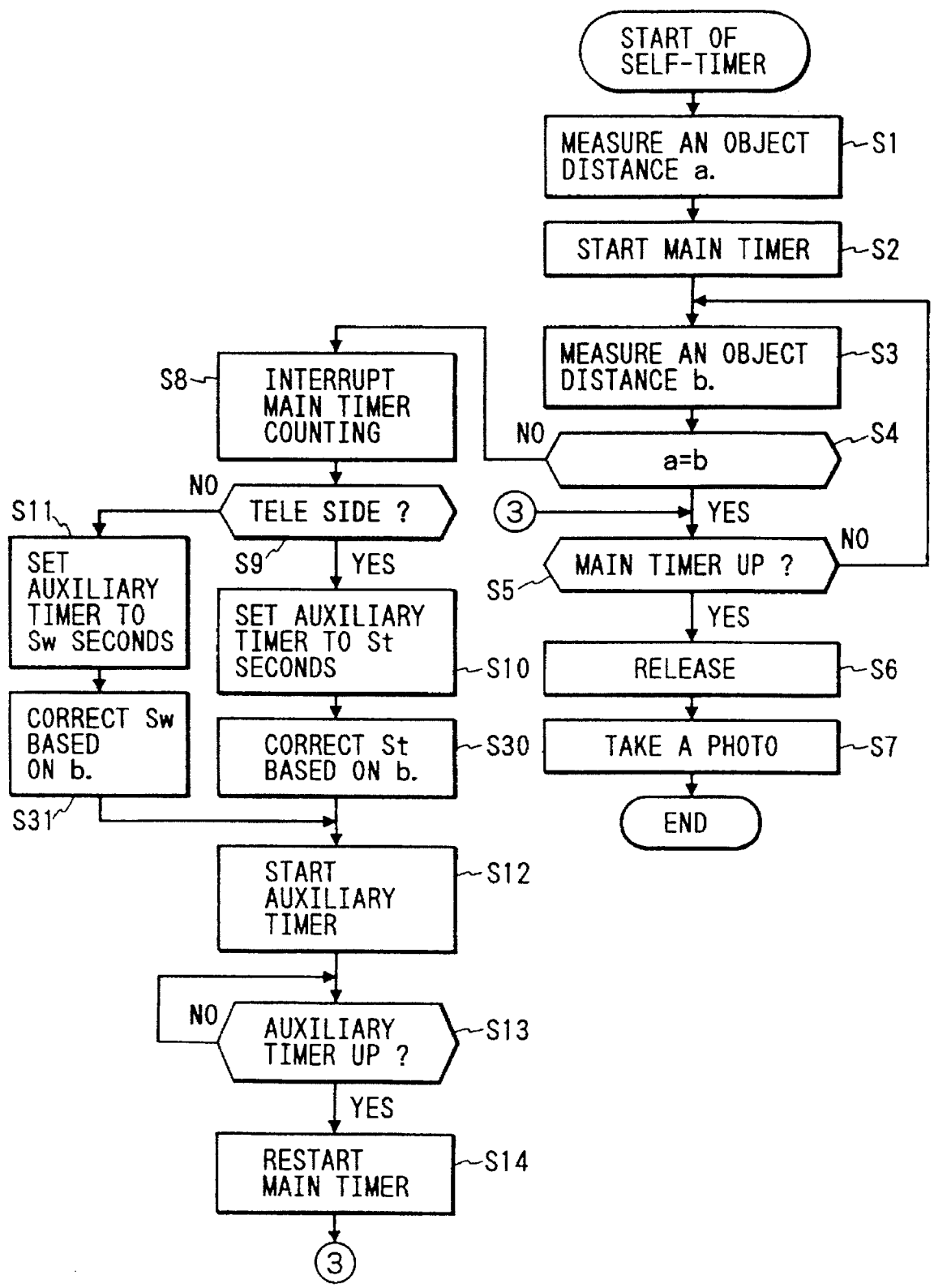
FIG. 15 is a flow chart showing a processing procedure in the controller of still a further embodiment.
Figure 16:
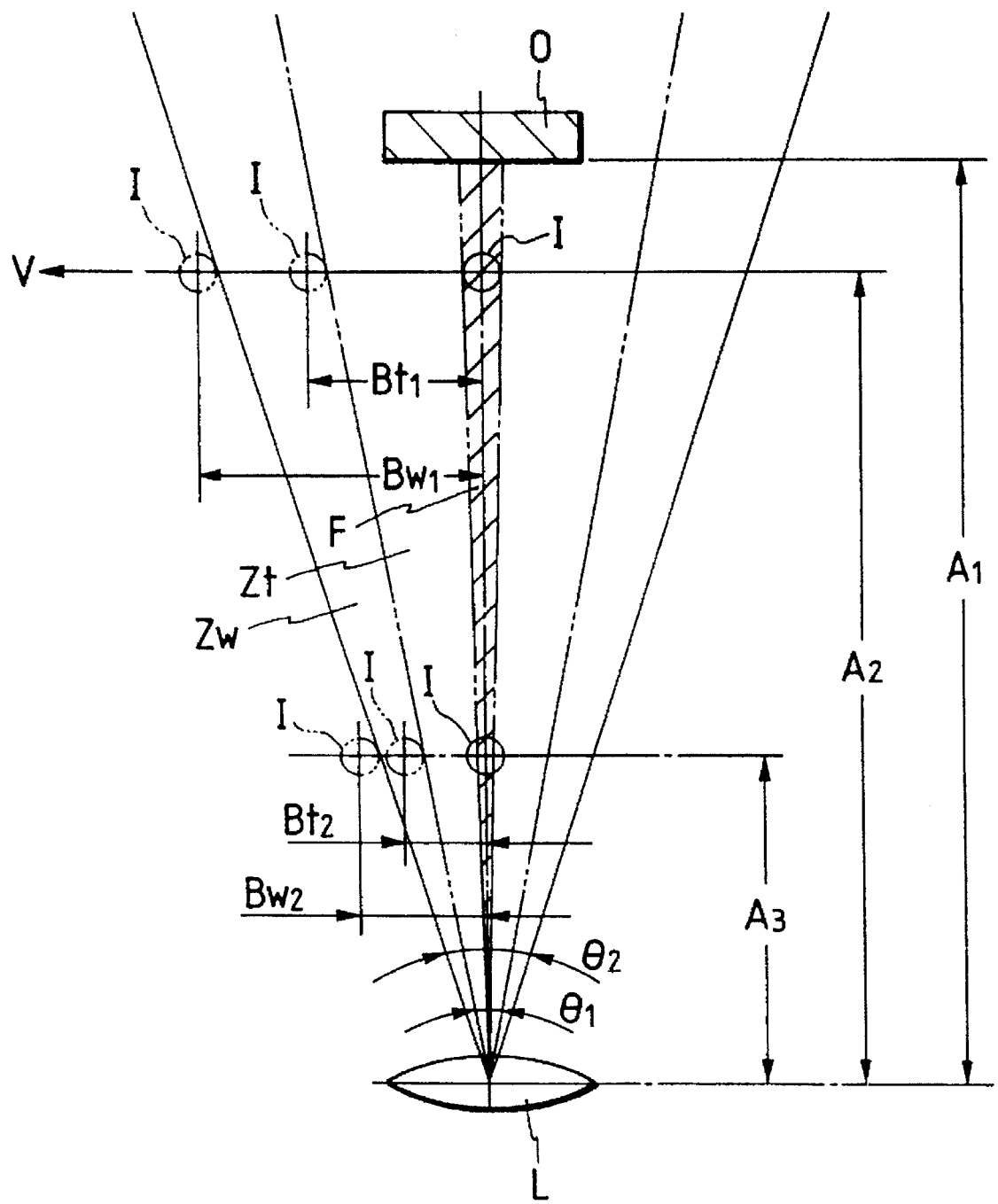
FIG. 16 is a view for illustrating the setting and correction of an auxiliary timer counting time in the embodiment of FIG. 15.

Reference is now had to FIGS. 15 and 16 to describe a further embodiment. In this embodiment, portions common to those in the embodiment of FIG. 11 are given the same reference characters and need not be described.

As seen in FIG. 15, the difference of the camera of this embodiment from the embodiment of FIG. 11 is that steps S30 and S31 for correcting the count times St seconds and Sw seconds set at the step S10 or S11, on the basis of the object distance b measured at the step S3 are added to the processing procedure for self-timer photographing. The correcting method at the steps S30 and S31 will hereinafter be described with reference to FIG. 16 showing the photographing area, like FIG. 12.

In FIG. 16, as is apparent when the movement distances Bt1 and Bw1 until the invading body I frames out when it crosses a location spaced apart by a distance $A_2$ from the photo-taking lens L are compared with the movement distances Bt2 and Bw2 when the invading body I crosses a location spaced apart by a distance $A_3$ ( $<A_2$) from the photo-taking lens L, the movement distance until the invading body I in the distance measuring area F frames out increases or decreases in proportion to the distance from the photo-taking lens L to the invading body I. Accordingly, if the movement velocity v of the invading body I is constant, the time required for the invading body I to come out of the photographing areas Zt and Zw also varies in proportion to the distance to the invading body I, and the variation rate thereof assumes a value inherent to the angles of field $\theta_1$ and $\theta_2$.

So, at the steps S30 and S31, how much the distance $A_3$ over which the invading body I has actually passed deviates forwardly or rearwardly from the distance $A_2$ which provides the reference is calculated from the object distance b measured at the step S3, and the amount of deviation is multiplied by coefficients conforming to the angles of field $\theta_1$ and $\theta_2$ to thereby find the amount of correction of the count timers. When the object distance b is greater than the distance $A_2$ which provides the reference, the amount of correction is added to the count timers St and Sw, and when the object distance b is smaller than the distance $A_2$ which provides the reference, the amount of correction is subtracted from the count timers St and Sw.

As is apparent from the foregoing, in the present embodiment, owing to the process of the steps S30 and S31, when the invading body passes relatively near the photo-taking lens, the amount of prolongation of the self-timer photographing time is small, and when conversely the invading body passes far from the photo-taking lens, the amount of prolongation of the self-timer photographing time increases and therefore, the invading body can be prevented from being photographed and yet the useless prolongation of the self-timer photographing time can be prevented. The present embodiment is particularly effective for the prevention of the waste time when the invading body passes near the photo-taking lens.

In the present embodiment, the reference position of the invading body when the count time of the auxiliary timer 506 is determined can be set arbitrarily and therefore, the designing thereof is easy. In this respect, in the embodiment of FIG. 11, the count times St and Sw must be uniformly determined and therefore, it becomes necessary to determine the most efficient time prolongation with the actual condition of self-timer photographing taken into account.

In the present embodiment, the count time of the auxiliary timer increased or decreased in conformity with the angle of field of the photo-taking lens is corrected further in conformity with the distance of the invading body, whereas the present invention is not restricted to such a combination of the correction of the angle of field and the correction of the distance, but even when the present invention is applied to a camera with a single-focus lens, the amount of prolongation of the self-timer photographing time can be appropriately determined in conformity with the passage position of the invading body. Also, the present embodiment may be combined with the camera of the FIG. 14 embodiment.

The change of the amount of prolongation of the self-timer photographing time conforming to the object distance is neither restricted to the example in which the set time of the auxiliary timer is corrected, but the set time itself of the main timer 505 may be changed.

In each of the above-described embodiments, if the object distance varies even slightly, the step S4 is negated and the self-timer photographing time is prolonged, but the case where "the object distance varies" as referred to herein is not limited to such a strict case, but includes a case where it is judged that "there is no variation" when the amount of variation in the object distance is within a predetermined tolerance, and it is judged that "there is a variation" when said amount of variation exceeds the tolerance. In such case, even if a desired object itself changes its position more or less or the operator of the self-timer switch joins the object and the object distance varies more or less, the self-timer photographing time will conveniently be not prolonged.

The detection of the object distance during the counting of the self-timer photographing time is neither restricted to the example in which the detection of the object distance is repetitively effected during the counting of the self-timer photographing time, but the object distance may be detected only immediately before time is up, and the self-timer photographing time may be prolonged.

In the above-described embodiments, the main timer 505 constitutes time counting means, the photo-taking device 503 constitutes photo-taking means, the distance measuring device 502 constitutes object distance detecting means the tele switch SW4, the wide switch SW4 and the controller 501 together constitute angle of field discriminating means, the auxiliary timer 506 constitutes self-timer photographing time prolonging means, and the controller 501 constitute angle of field coping control means and distance coping control means.

What is claimed is:

1. An automatic photographic camera, comprising:
   a set device setting an object distance at which a photographing lens should focus to a desired value;
   a detection device having a photographing area and a detection area that is smaller than the photographing area, the detection area generating a detection signal when an object is located at the object distance set by the set device within the detection area;
   a timer counting a first predetermined time; and
   a control device executing a photographing operation in accordance with said detection signal and executing a photo-taking operation when no detection signal is detected during the time that the timer counts and when the first predetermined time has been counted by the timer.

2. An automatic photographic camera according to claim 1, having means for effecting continuous photographing, and means for stopping photographing when the number of frames to be continuously exposed reaches a predetermined number.

3. An automatic photographic camera according to claim 1, having means for effecting continuous photographing, and means for stopping photographing when a second predetermined time elapses after the start of the continuous photographing.

4. An automatic photographing apparatus for use in a camera, comprising:
   a timer determining a time for automatic photographing;
   a range-finding device performing a range-finding operation during the time of operation of the timer;
   a memory storing a range value measured by the range-finding device, renewing the stored measured range value to a new measured range value when the difference between the new measured range value and the stored measured range value is within a predetermined range, and maintaining the stored measured range value when the difference is not within said predetermined range;
   a focus adjusting device adjusting a focus state of a photographing optical system based on the measured range value stored in the memory;
   a control device permitting a shutter release operation to occur within the automatic photographing camera if the difference between the new measured range value and the stored measured range value is within the predetermined range when the time determined by the timer is a predetermined time, and prohibiting the shutter release operation if the difference between the new measured range value and the stored measured value is not within the predetermined range.

5. An automatic photographing apparatus according to claim 4, wherein the range-finding device effects range-finding when the measured range value becomes a value within the predetermined range, and the focus adjusting device adjusts the focus state based on the result of a latest range-finding operation.

6. A camera with a self-timer photographing function, comprising:

a time counting device counting a self-timer photographing time;

a photo-taking device starting a photo-taking operation when time counted by the time counting device reaches a predetermined self-timer photographing time;

an object distance detecting device detecting a distance to an object in a distance measuring area set in at least one portion of a predetermined photographing area;

a self-timer photographing time prolonging device prolonging a remaining time until the photo-taking device starts a photo-taking operation and when the object distance detected by the object distance detecting device varies during the time counted by the time counting device;

an angle of field discriminating device discriminating an angle of field of a photo-taking lens of the camera; and a control device varying, on the basis of the angle of field discriminated by the angle of field discriminating device, the prolonged time set by the self-timer photographing time prolonging device so that as the angle of field becomes wider, the prolonged time becomes longer.

7. A camera with a self-timer photographing function, comprising:

a timer counting device counting a self-timer photographing time;

a photo-taking device starting a photo-taking operation when the time counted by the time counting device reaches a predetermined self-timer photographing time;

an object distance detecting device detecting a distance to an object in a distance measuring area set in at least one portion of a predetermined photographing area;

a self-timer photographing time prolonging device prolonging a remaining time until the photo-taking device starts the photo-taking operation when the object distance detected by the object distance detecting device varies during the time being counted by the time counting device; and a control device varying, when the object distance is varied during the time being counted by the time counting device, on the basis of the varied object distance measured by the object distance detecting unit, the prolonged time set by said self-timer photographing time prolonging device so that as the distance becomes greater, the prolonged time becomes longer.

* * * * *